(12) United States Patent
Dent et al.

(10) Patent No.: US 8,248,479 B2
(45) Date of Patent: Aug. 21, 2012

(54) APPARATUS FOR THE EVALUATION OF POLYNOMIALS

(75) Inventors: Alan John Dent, Stevenage (GB); Barry Peter Woodcock, Stevenage (GB)

(73) Assignee: MBDA UK Limited, Hertfordshire (GB)

( * ) Notice: Subject to any disclaimer, the term of this patent is extended or adjusted under 35 U.S.C. 154(b) by 150 days.

(21) Appl. No.: 12/171,177

(22) Filed: Jul. 10, 2008

(65) Prior Publication Data

US 2010/0238305 A1    Sep. 23, 2010

(30) Foreign Application Priority Data

Jun. 6, 1997   (GB) .................................... 9711604.0

(51) Int. Cl.
*H04N 5/228* (2006.01)
(52) U.S. Cl. .................................................. 348/208.4
(58) Field of Classification Search .............. 382/103, 382/272; 340/736; 348/208.4
See application file for complete search history.

(56) References Cited

U.S. PATENT DOCUMENTS

| | | | |
|---|---|---|---|
| 3,843,872 A | | 10/1974 | Shimomura |
| 3,967,100 A | | 6/1976 | Shimomura |
| 4,841,292 A | * | 6/1989 | Zeno ............................ 345/419 |
| 4,879,598 A | | 11/1989 | Seto |
| 5,030,984 A | * | 7/1991 | Buckler et al. ................ 396/153 |
| 5,063,361 A | * | 11/1991 | Smith et al. ................... 332/103 |
| 5,118,943 A | * | 6/1992 | Le Bars et al. ................ 250/332 |
| 6,181,831 B1 | * | 1/2001 | Sadjadian ..................... 382/276 |
| 2005/0275733 A1 | | 12/2005 | Chao |

FOREIGN PATENT DOCUMENTS

| | | |
|---|---|---|
| EP | 0 324 925 A2 | 7/1989 |
| EP | 0 419 342 A1 | 3/1991 |
| GB | 1383661 | 2/1975 |
| GB | 2 449 219 A | 11/2008 |

OTHER PUBLICATIONS

Search Report and Written Opinion issued by the European Patent Office in corresponding Italian Patent Application No. RM20080372, Nov. 3, 2009.
Search Report issued by the French Patent Office in corresponding French Patent Application No. 0854733, Jan. 13, 2010.
Goebel, Peter Michael, et al., "Blind Background Subtraction in Dental Panoramic X-Ray Images: An Application Approach," *Lecture Notes in Computer Science*, Jan. 1, 2005, pp. 434-441, vol. 3663, Springer-Verlag Berlin Heidelberg, DE.
Schmidt, Ferdinand, et al., "An automatic method for the identification and interpretation of clustered microcalcifications in mammograms," *Physics in Medicine and Biology*, Jan. 1, 1999, pp. 1231-1243, vol. 44, Taylor and Francis Ltd., London, GB.
Official Action issued by the Swedish Patent Office in corresponding Swedish Patent Application No. 0801652-9 and English-language translation, Dec. 17, 2008, 7 pps.

* cited by examiner

*Primary Examiner* — Anand Bhatnagar
*Assistant Examiner* — Amara Abdi
(74) *Attorney, Agent, or Firm* — Buchanan Ingersoll & Rooney PC

(57) ABSTRACT

Evaluation of multi-dimensional high order polynomials at high speed requires complex computing resources. This invention comprises a computing apparatus which allows the efficient and high speed calculation of such polynomials with a relatively simple computing resource. The computing resource consists entirely of adders and latches. There are no multipliers. The invention has particular application for the removal of low frequency image distortion due to kinetic heating in IR imaging missiles.

12 Claims, 5 Drawing Sheets

APPARATUS FOR THE EVALUATION OF POLYNOMIALS

Figure 1:
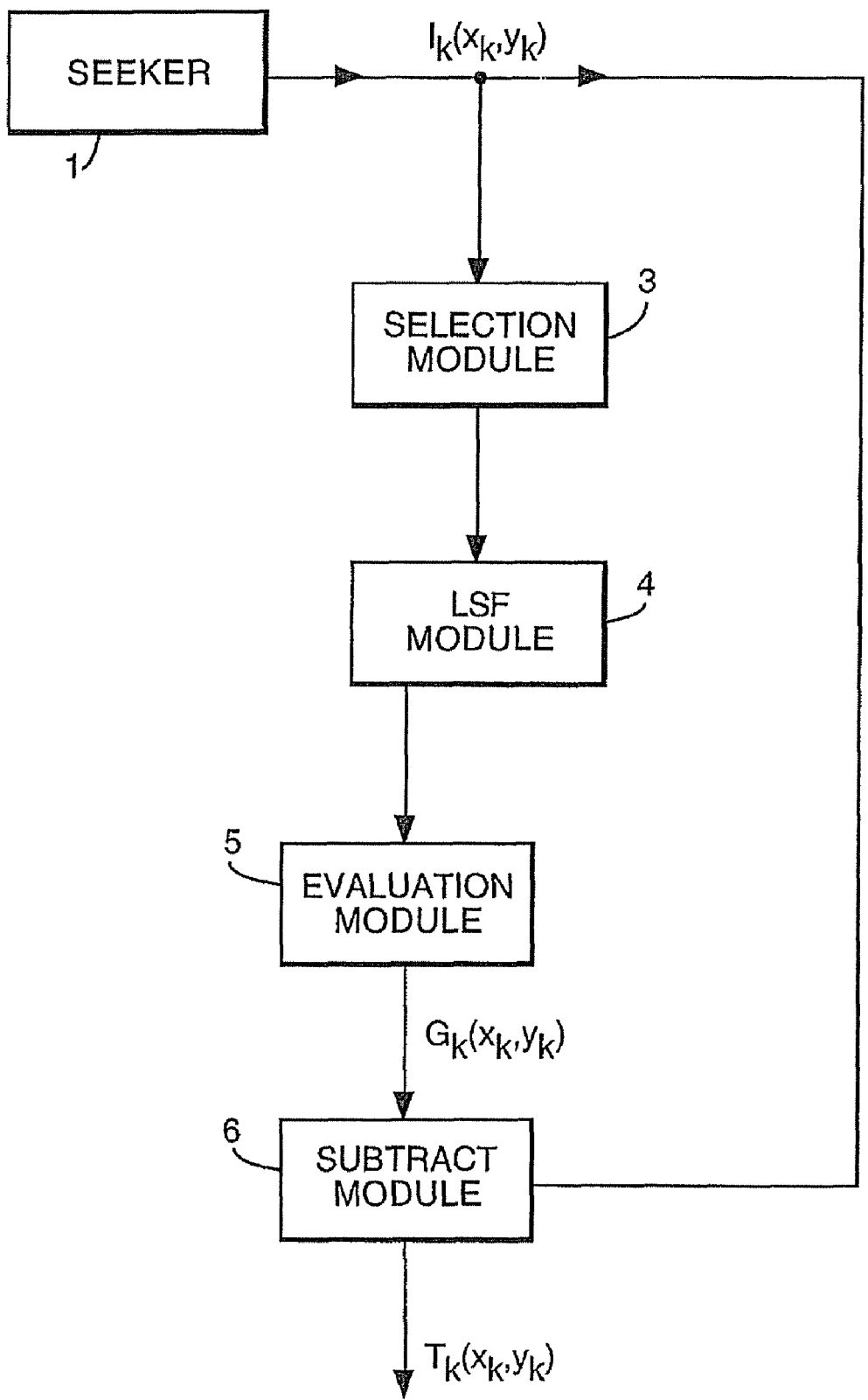

This invention relates to the real time evaluation of polynomials of one dimension or greater and has particular application to image processing.

Conventional techniques for evaluating polynomials use a multiplication process which is costly in processing time and which requires complex computing resources.

According to a first aspect of the present invention, apparatus for evaluating a polynomial function for a set of points, wherein the function is represented by the coefficients of an Nth order polynomial, includes an adder whereby each value for the polynomial function is determined by adding that value for the previous point to an offset value.

The polynomial may be single variate or multi-variate, depending on the application.

The coefficients may be derived by any appropriate process, such as a least squares fit, carried out on a set of measured data for example.

In contrast with the conventional technique which uses a multiplication process for evaluating a polynomial function, the invention uses an addition process which can be performed much more quickly by the appropriate processing hardware.

As previously mentioned the apparatus has particular application to image processing and is especially useful in overcoming a problem inherent in infra red seekers on board guided missiles.

In general, an infra red (IR) seeker mounted in the nose region of a missile is protected by an IR transmissive dome.

It has been observed that movement of the missile through the atmosphere causes local heating of the dome which results in a distortion of the thermal image received by the IR seeker.

The dome is usually hottest near its centre giving rise to a temperature profile across the IR seeker's field of view. The emissivity of the dome rends to be a function of temperature, thus distorting the received image further still. These effects contribute to an additive bias in the seeker output which is governed by the thermal profile of the dome.

This bias is sometimes known as "low frequency shading" which manifests itself as a slowly varying intensity profile. The temporal thermal profile on the dome is mapped by associated seeker optics onto the array such that it causes image distortion. The low frequency shading is further compounded by the non-linearities in the transfer function of the seeker optics.

High frequency shading may also be apparent in the seeker output and this is usually caused by self emission and internal reflections from the associated optics. This type of shading gives rise to the generation of a rogue feature in the seeker output. The problem of high frequency shading is not addressed by this invention but mentioned for the sake of completeness.

The method of polynomial evaluation described above can be used in order to reduce the effects of low frequency shading to an acceptable level.

Accordingly, in a second aspect, the present invention comprises image processing apparatus for processing output pixel data from a scanned, two-dimensional imaging array, in which an output intensity function $I(x_k,y_j)$ from the array comprises an irregular surface consisting of target and background data superimposed on a bias approximating to a smooth surface represented by an intensity function $G(x_k,y_j)$ where $G(x_k,y_j)$ is an Nth order polynomial.

the apparatus including;

means for calculating the coefficients of the intensity function $G(x_k,y_j)$ from the output intensity function $I(x_k,y_j)$ means for evaluating the intensity function $G(x_k,y_j)$ for each pixel value $(x_k,y_j)$ given said coefficients, and means for subtracting $G(x_k,y_j)$ from $I(x_k,y_j)$ to leave unbiased target and background data, in which the means for evaluating $G(x_k,y_j)$ includes an adder whereby each value for $G(x_k,y_j)$ is determined by adding that value for the previous point $G(x_{k-1}, y_{j-1})$ to an offset value.

Thus the invention provides a means for correcting the intensity function of a distorted surface for low frequency shading.

Surface correction consists of two processes: the calculation, for each pixel of the value of the shading surface at the position of that pixel and the subtraction of shading value from the shaded pixel value, resulting in a pixel value that has the shading value removed. The first process requires calculation of the estimating polynomial. The second process is a simple subtraction.

Normally the seeker is mounted within a gimbal. If the surface evaluation and subtraction processes are carried out on images obtained with different gimbal positions, then the pixel co-ordinates $(x_k,y_j)$ must be corrected for the gimbal motion between frames. Therefore, optionally the invention includes a gimbal position input and transformer means for transforming the pixel co-ordinates, to account for any relative motion.

The required transformation can be represented by a n×n matrix. The matrix coefficients only need to be calculated once for each evaluation frame pair.

Figure 2:
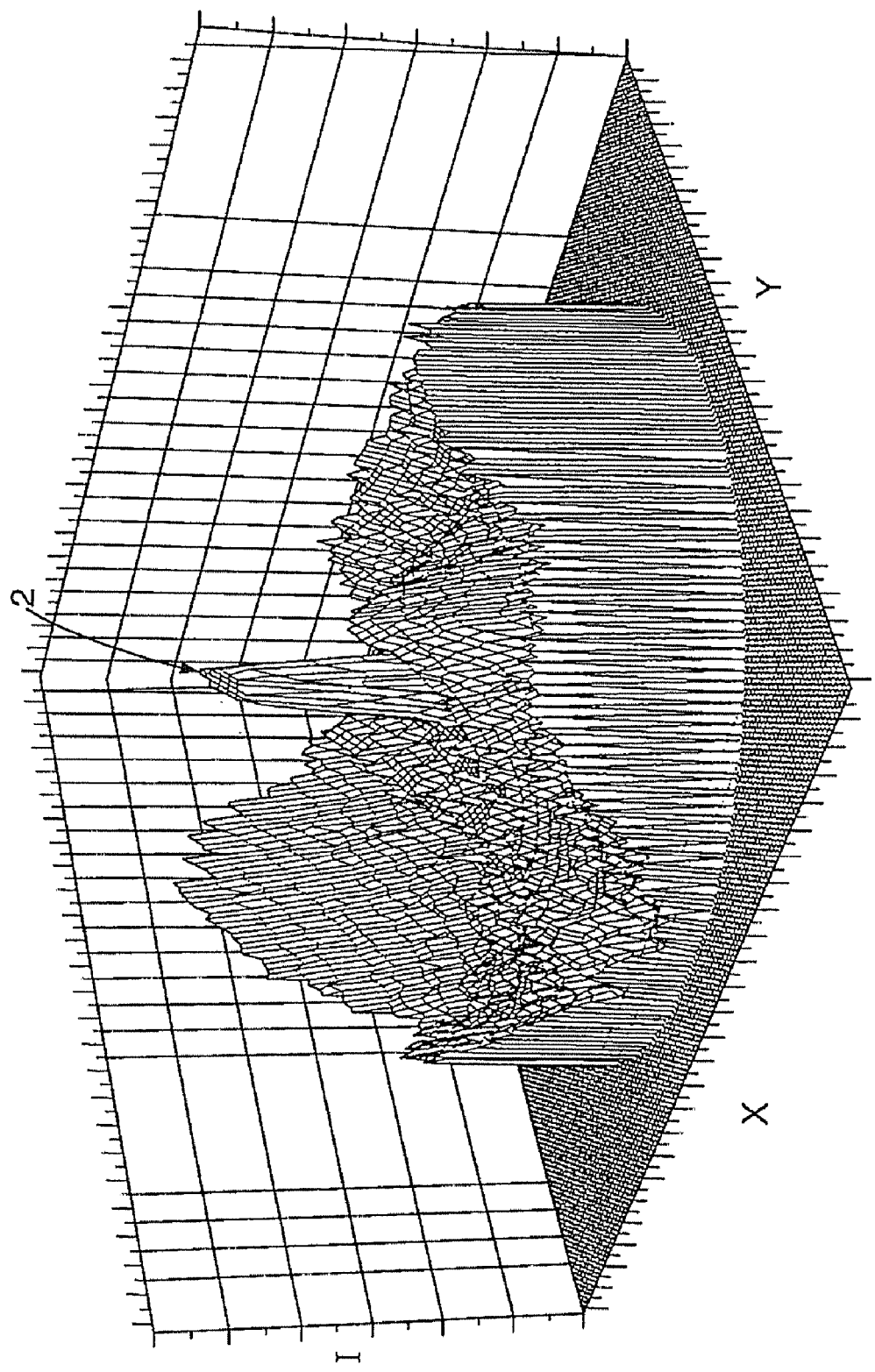
Figure 3:
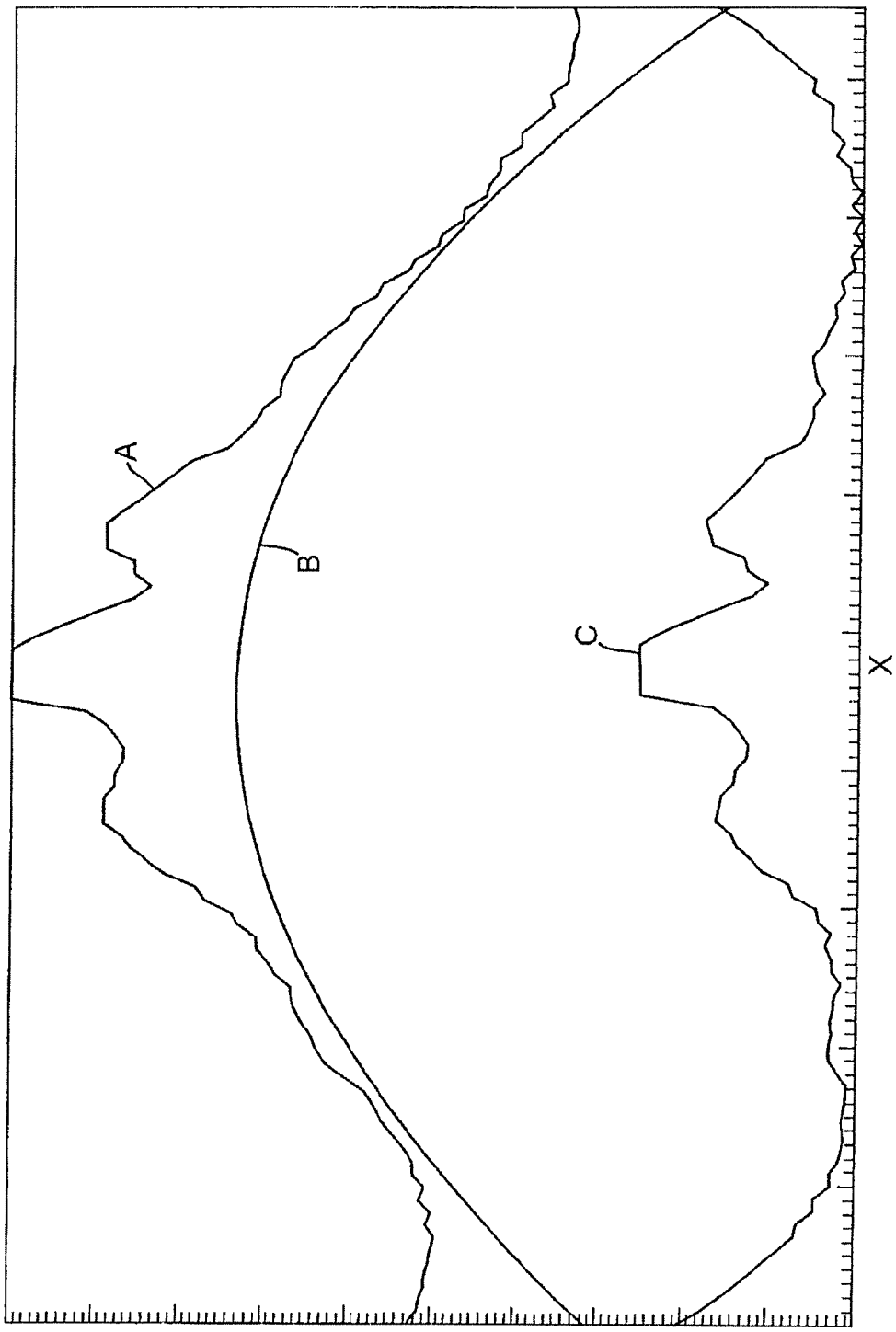
Figure 4:
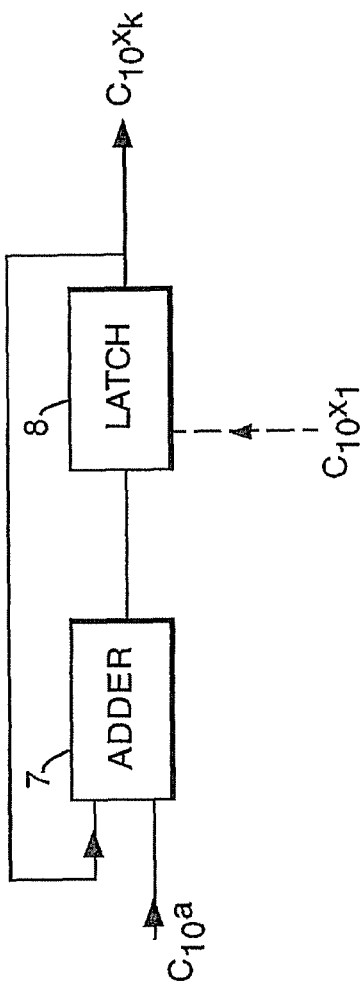
Figure 5:
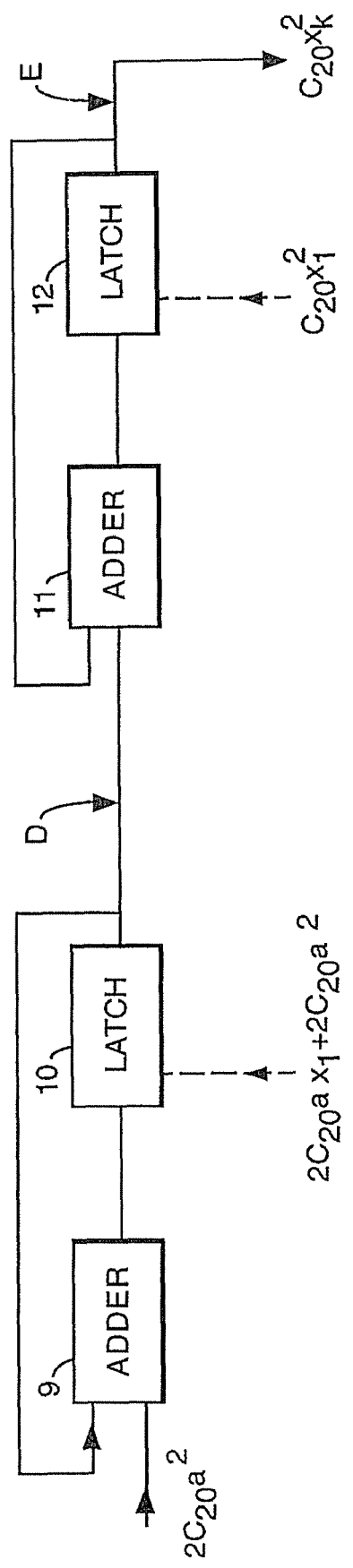
Figure 6:
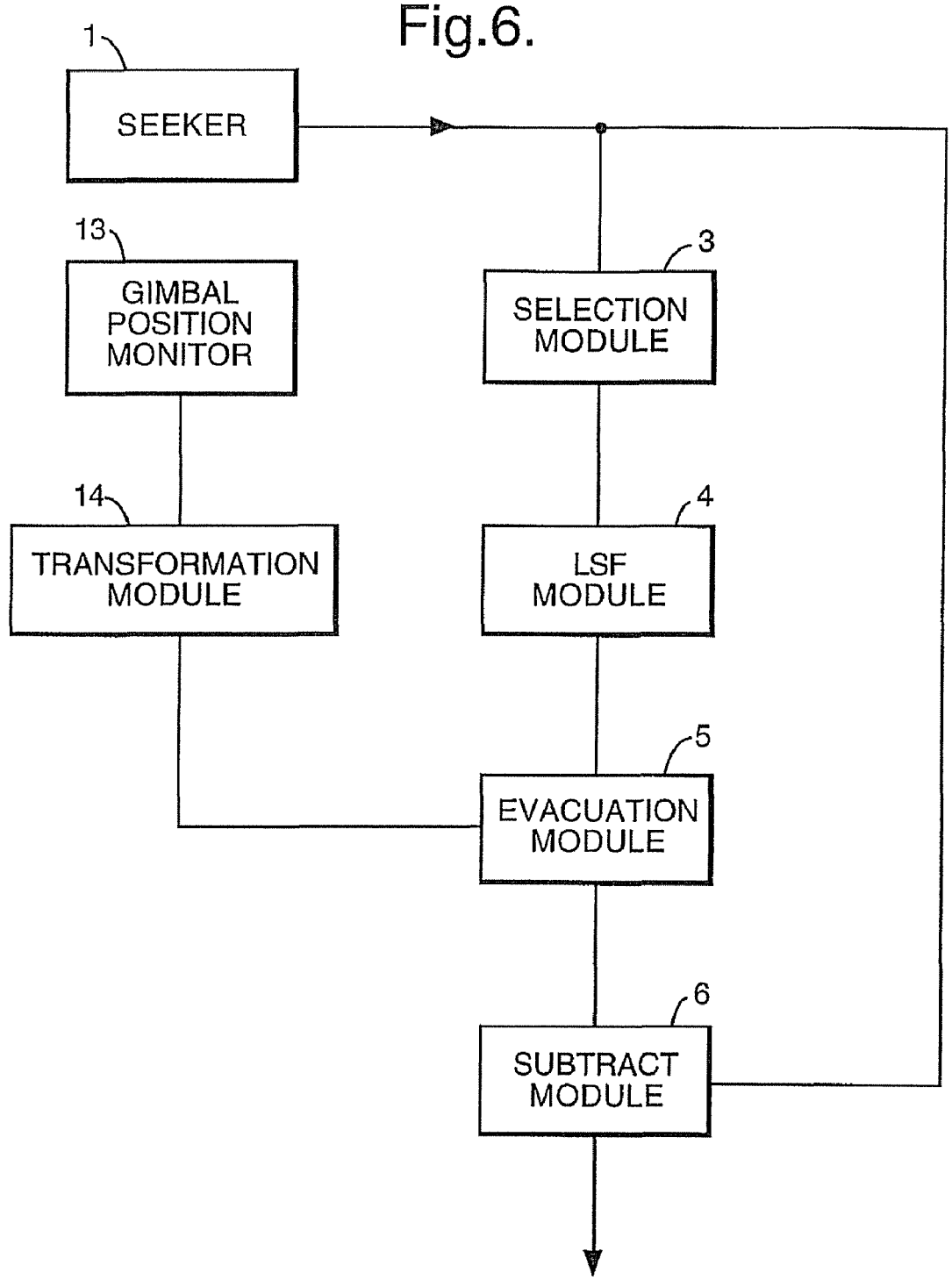

Some embodiments of the invention will now be described, by way of example only, with reference to the drawings of which;

FIG. 1 is a block diagram of image processing apparatus in accordance with the invention, FIG. 2 is a 3-D representation of the output of an IR seeker, FIG. 3 shows curves representing the output shown in FIG. 3, before and after processing, FIGS. 4 and 5 are block diagrams of logic circuits for implementing a part of the invention, And FIG. 6 is a block diagram of an alternative image processing apparatus in accordance with the invention.

In FIG. 1 an IR seeker 1 having a 256×256 2-D pixel array is mounted in the nose of a missile (not shown).

The seeker 1 is scanned in raster fashion and its output, which is a video output of successive frames, can be represented by the two-dimensional intensity function; $I(x_k,y_j)$ where the values $x_k$ and $y_j$ range from 1 to 256.

A typical intensity function is shown in FIG. 2. Here, a target image 2 can be seen in the centre of background clutter. As previously explained, this intensity function is contaminated by a bias due to heating and other effects in the structure surrounding the seeker 1.

Returning to FIG. 1, the seeker output is subsequently processed by a sequence of modules.

A selection module 3 selects a number of $I(x_k,y_j)$ values, eg a 16×16 pixel grid for the purposes of calculating the coefficients of a polynomial function by performing a least squares fit to the surface represented by $I(x_k,y_j)$.

A least squares fit (LSF) module 4 calculates the coefficients of a fourth order polynomial which best fits the $I(x_k,y_j)$ values chosen.

An evaluation module 5 uses the calculated coefficients to evaluate a new intensity function $G(x_k,y_j)$ for $x_k$ and $y_j$ ranging from 1 to 256 i.e. for all 256×256 pixels.

A subtract module 6 subtracts each $G(x_k,y_j)$ pixel value from its equivalent $I(x_k,y_j)$ pixel value to give a new 2-D surface function $T(x_k,y_j)$.

Referring now to FIG. 3, curve A is a cross section through the plot of FIG. 2, showing x versus intensity G. The unwanted bias which contaminates the seeker output is represented by curve B. This is a smooth curve which in 2-dimensions is the surface represented by $G(x_k,y_j)$, i.e. the least squares fit performed on the function $I(x_k,y_j)$.

Curve C shows the result of subtracting curve B from curve A. This is the process performed by the subtraction module 6. A 2-D representation of curve C is the function $T(x_k,y_j)$. This latter function is the unbiased target and background data.

The operation of each of the aforementioned modules will now be explained in greater detail with reference to FIGS. 1, 4 and 5.

For each frame of video data which comprises the output of the IR seeker 1, a 16×16 grid is identified out of the possible 256×256 pixels by the selection module 3. The choice of points and the number of points is arbitrary, the choice being a compromise between an accurate representation of the overall surface shape represented by the function $I(x_k,y_j)$ and the processing time available.

These selected points are then passed on to the LSF module 4. This is a conventional device which calculates the coefficients of an Nth order polynomial which best describes the surface represented by the selected points. In this example, a fourth order polynomial is chosen to represent an intensity function G(x,y) having the form:

$$G(x, y) = C_{00} + C_{10}x + C_{01}y + C_{20}x^2 + C_{02}y^2 + C_{11}xy + C_{30}x^3 + C_{03}y^3 + C_{21}x^2y + C_{12}y^2x + C_{04}y^4 + C_{13}xy^3 + C_{22}x^2y^2 + C_{31}x^3y + C_{40}x^4 \quad (1)$$

A function of lesser or greater order could be used depending on the application. In this example, the inventors have found that a fourth order function gives the best results.

The LSF module 4 calculates the values of the 'C' coefficients by conventional methods and passes these values to the evaluation module 5. Given, the coefficients, the evaluation module 5 calculates the function $G(x_k,y_j)$ for $x_k$ and $y_j$ ranging from 1 to 256 i.e. the purpose of this module is to generate a smooth 2D surface which best fits the function $I(x_k,y_j)$ by solving equation (1) for 256×256 points.

Conventionally, this would be done by performing the necessary multiplications and additions for each $G(x_k,y_j)$. However, multiplication routines are costly in terms of processing time. The invention overcomes this disadvantage by solving equation (1) by performing additions only, which takes far less processing time.

For an understanding of how this can be done, consider the following general case:

The product Cx may be written.

$$Cx = C(x-a)Ca \quad (2)$$

where x is any variable and C and a are constants.

Now consider the terms in x for the intensity function $G(x_k,y_j)$ (equation 1)

i.e. $G_1(x) = C_{10}x_1$ $G_2(x) = C_{10}x_2$ $$G_k(x) = C_{10}x_k \quad (3)$$

Comparing these equations (3) with equation (2) we can write, for example.

$$G_2(x) = C_{10}(x_2 - a) + C_{10}a \quad (4)$$

We can apply the same analysis to the terms in y only and write a similar expression $$G_2(y) = C_{01}(y_2 - b) + C_{01}a \quad (5)$$

(where b is a constant)

Because of the nature of the scanning process employed by the IR seeker, successive values of x and y increment by equal amounts each time.

i.e. let $x_1 = x_2 - a$ \quad (6)

and $y_1 = y_2 - b$ \quad (7)

Therefore equations (4) and (5) can be written respectively, $$G_2(x) = G_1(x) + C_{10}a \quad (4A)$$

and, $$G_2(y) = G_1(y) + C_{01}b \quad (5A)$$

and in general:

$$G(x_k,y_j) = G(x_{k-a},y_j) + C_{10}a \quad (8)$$

If there is no relative rotational motion between frames then 'a' and 'b' are both equal to 1.

If there is a relative rotational movement then 'a' and 'b' are somewhat less than '1' their value being determined by the transformation matrix process previously mentioned.

From equation (8) it can be seen that the intensity function for a given point is equal to the value of the intensity function of the previously calculated point plus an offset.

The principle can be extended to the higher order terms of equation 1 and a further example will be given hereunder.

Thus the intensity function $G(x_k,y_j)$ can be determined solely by addition processes instead of multiplication processes once the initial values have been established.

FIG. 4 shows how equation 8 can be implemented in hardware. FIG. 4 shows a two-unit building block of an adder 7 and a latch 8.

A first input of the adder 7 comprises the initial value C10.a. The output of the adder is connected to the input of the latch 8 which also receives an initial value $C_{10}x_1$. The output of the latch 8 is fed back to a second input of the adder 7.

Initially the first term in x, $C_{10}x_1$, is calculated and transferred to the latch output and to the first input of the adder 7. On the subsequent latch clock pulse, $C_{10}x_1$ is added to $C_{10}.a$ and is transferred to the latch output. This value is thus $C_{10}x_2$.

Thereafter, subsequent values for $C_{10}x$ are calculated by adding the previous value $C_{10}x_{k-a}$ to $C_{10}a$. This structure of FIG. 4 can also be used to evaluate the corresponding terms in y.

Calculation of each $G(x_k,y_j)$ value takes just one latch clock cycle.

As previously mentioned, the technique illustrated by FIG. 4 can be extended for determination of the higher order terms. Consider now the term in $x^2$.

The product $Cx^2$ may be written:

$$Cx^2 = C(x-a)^2 + 2Cax - Ca^2 \quad (9)$$

$$\text{or; } Cx^2 = C(x-a)^2 + 2Ca(x-a) + Ca^2 \quad (10)$$

From equation 6, we can write, $Cx_2^2 = Cx_1^2 + 2Cax_1 + Ca^2$ (11)

Thus the terms in $x^2$ (or $y^2$) for the expression for $G(x_k, y_j)$ in equation (1) can be evaluated by using the hardware of FIG. 5. This shows two adder and latch pairs. A first adder 9 receives an input $2C_{20}a^2$. Its output is connected to a first latch 10 which also receives an initial input value $2C_{20}ax_1 + 2C_{20}a^2$. This latch's output is fed back to a second input of the adder 9. The latch 10 output also goes to a second adder 11 whose output in turn goes to a second latch 12. The second latch receives an initial input value $C_{20}x_1^2$ and its output is fed back to a second input of the second adder 11.

The outputs at points D and E i.e. of the first and second latches respectively are shown in the following table for the first three latch clock pulses

| Clock pulse no. | Output at D | Output at E |
|---|---|---|
| 1 | $2C_{20}ax_1 + C_{20}a^2$ | $C_{20}x_1^2$ |
| 2 | $2C_{20}ax_1 + C_{20}a^2 + 2C_{20}a^2$ [i.e. $2C_{20}ax_2 + C_{20}a^2$ from equations 3 and 4A] | $C_{20}x_1^2 + 2C_{20}ax_1 + C_{20}a^2$ [i.e. $C_{20}x_2^2$ from equation 11] |
| 3 | $2C_{20}ax_2 + C_{20}a^2 + 2C_{20}a^2$ [i.e. $2C_{20}ax_3 + C_{20}a^2$] | $C_{20}x_2^2 + 2C_{20}ax_2 + C_{20}a^2$ [i.e. $C_{20}x_3^2$] |

It can be shown that the remaining higher order terms in equation (1) can be determined in a similar fashion using the latch-adder building block.

The $x^3$ and $y^3$ and $x^2y$ terms, for example require three latch adder pairs, the $x^4$ and $y^4$ terms, four pairs and so on. In general a term of Nth order requires N latch-adder pairs for its implementation.

Returning now to FIG. 1, the evaluation module 5 is thus compose of an appropriate number of latch-adder pairs.

In this example, 'a' and 'b' values are equal to 1, i.e. there is no rotational motion between video frames. The evaluation module 5 is provided with the 'C' coefficients from the LSF module 4.

When each value for $G(x_k, y_j)$ for each pixel has been evaluated, it is passed to the subtract module 6 where it is subtracted from its equivalent $I(x_k, y_j)$. Thus when one complete video frame has been processed, the output data from the subtraction module 6 comprises the modified surface of curve C in FIG. 3 i.e. the function $T(x_k, y_j)$.

The alternative embodiment of FIG. 6 has the same modules as that of FIG. 1 with the additional features of a gimbal position monitor 13 and a transformation module 14. To correct the pixel co-ordinates $(x_k, y_j)$ for rotational gimbal motion between frames, the transformer module 14 receives an input from the gimbal position monitor 13 and determines values for 'a' and 'b' which it uses to adjust the initial values loaded into the latches comprising the evaluation module. The transformer module 14 operates by means of a conventional technique employing n×n matrix multiplication.

The invention claimed is:

1. An image processing apparatus for processing output pixel data from a scanned, two-dimensional imaging array having an output intensity function $I(x_k, y_j)$, the apparatus comprising:

means for evaluating an Nth order polynomial intensity function $G(x_k, y_j)$, where $I(x_k, y_j)$ comprises an irregular surface consisting of target and background data superimposed on a bias approximating to a smooth surface represented by $G(x_k, y_j)$, said evaluating means including an adder adapted to determine the intensity function $G(x_k, y_j)$ for a given point by adding the value of the intensity function $G(x_{k-1}, y_{j-1})$ of a previously calculated point to an offset value;

means for calculating coefficients of the intensity function $G(x_k, y_j)$ from the output intensity function $I(x_k, y_j)$;

means for subtracting $G(x_k, y_j)$ from $I(x_k, y_j)$; and means for outputting unbiased target and background video data based on a result of the subtracting means.

2. The image processing apparatus according to claim 1 wherein the means for calculating the coefficients is adapted to perform a least squares fit to the received intensity function $I(x_k, y_j)$.

3. The image processing apparatus as claimed in claim 1 comprising:

means for compensating for motion of the imaging array.

4. The image processing apparatus as claimed in claim 3 wherein the means for compensation for imaging array motion employs a matrix multiplication process.

5. The image processing apparatus as claimed in claim 1, wherein individual terms of the intensity function are calculated by N pairs of modules, each pair comprising an adder and a latch where N is an order of an individual term to be calculated.

6. The image processing apparatus as claimed in claim 1 comprising:

means for compensating for motion of the imaging array in which individual terms of the intensity function are calculated by N pairs of modules, each pair comprising an adder and a latch where N is an order of an individual term to be calculated.

7. The image processing apparatus as claimed in claim 2 comprising:

means for compensating for motion of the imaging array.

8. The image processing apparatus as claimed in claim 7 wherein the means for compensation for imaging array motion employs a matrix multiplication process.

9. The image processing apparatus as claimed in claim 1 wherein individual terms of the intensity function are calculated by N pairs of modules, each pair comprising an adder and a latch where N is an order of an individual term to be calculated.

10. The image processing apparatus as claimed in claim 2 wherein individual terms of the polynomial are calculated by N pairs of modules, each pair comprising an adder and a latch where N is an order of an individual term to be calculated.

11. The image processing apparatus as claimed in claim 2 comprising:

means for compensating for motion of the imaging array in which individual terms of the polynomial are calculated by N pairs of modules, each pair comprising an adder and a latch where N is an order of an individual term to be calculated.

12. The image processing apparatus according to claim 1, wherein the means for evaluating $G(x_k, y_j)$ are adapted to evaluate the intensity function $G(x_k, y_j)$ for each pixel value $(x_k, y_j)$ given said coefficients.

* * * * *